(12) United States Patent
Bergmann et al.

(10) Patent No.: US 10,829,148 B2
(45) Date of Patent: Nov. 10, 2020

(54) HYDRAULIC STEERING DEVICE WITH ENHANCED FAULT PREVENTION

(71) Applicant: HYDRAULIK NORD FLUIDTECHNIK GMBH & CO. KG, Parchim (DE)

(72) Inventors: Erhard Bergmann, Banzkow / OT Mirow (DE); Toralf Käckenmeister, Raduhn (DE); Markus De La Motte, Muchow (DE)

(73) Assignee: DANFOSS POWER SOLUTIONS PARCHIM GMBH, Parchim (DE)

( * ) Notice: Subject to any disclaimer, the term of this patent is extended or adjusted under 35 U.S.C. 154(b) by 120 days.

(21) Appl. No.: 16/067,637

(22) PCT Filed: Mar. 1, 2017

(86) PCT No.: PCT/EP2017/054772
§ 371 (c)(1),
(2) Date: Jul. 2, 2018

(87) PCT Pub. No.: WO2017/153223
PCT Pub. Date: Sep. 14, 2017

(65) Prior Publication Data
US 2019/0002018 A1    Jan. 3, 2019

(30) Foreign Application Priority Data

Mar. 7, 2016  (DE) .................. 10 2016 104 090

(51) Int. Cl.
*B62D 5/09* (2006.01)
*B62D 5/06* (2006.01)

(52) U.S. Cl.
CPC ............. *B62D 5/091* (2013.01); *B62D 5/062* (2013.01); *B62D 5/09* (2013.01)

(58) Field of Classification Search
CPC ........... B62D 5/091; B62D 5/062; B62D 5/09
See application file for complete search history.

(56) References Cited

FOREIGN PATENT DOCUMENTS

| DE | 102011080511 A1 | * | 2/2013 | ............. B60R 21/01 |
| DE | 10 2011 112625 A1 | | 3/2013 | |
| DE | 102011112625 A1 | * | 3/2013 | ............. B62D 5/091 |

OTHER PUBLICATIONS

International Search Report dated May 24, 2017, mailed Jun. 1, 2017.
English translation of International Search Report dated May 24, 2017, mailed Jun. 1, 2017.

* cited by examiner

*Primary Examiner* — Aaron L Troost
(74) *Attorney, Agent, or Firm* — Norris McLaughlin, P.A.

(57) ABSTRACT

A hydraulic steering device which hydraulically connects a steering cylinder to a supply system. The supply system is hydraulically operatively connectable to the steering cylinder via a steering assembly for the purposes of forming a main flow connection, and the supply system is furthermore hydraulically operatively connectable to the steering cylinder via a flow regulating valve arrangement, such that a secondary flow connection can be formed which bypasses the main flow connection and via which at least one first working chamber and one second working chamber of the steering cylinder can be supplied independently of one another with hydraulic fluid.

8 Claims, 5 Drawing Sheets

HYDRAULIC STEERING DEVICE WITH ENHANCED FAULT PREVENTION

This application is the U.S. National Stage of International Application No. PCT/EP2017/054772, filed Mar. 1, 2017, which claims foreign priority benefit under 35 U.S.C. § 119 of German Application No. 10 2016 104 090.8 filed Mar. 7, 2016.

The invention relates to a hydraulic steering device.

Hydraulic steering devices, for example in the vehicle sector, are fundamentally known to the person skilled in the art. Such a hydraulic steering device is described, for example, in DE 10 2011 112 625 A1. This is generic for the subject matter of the present invention.

The core component of such hydraulic steering devices is a steering cylinder which is hydraulically connected to a supply system. The supply system is, in this case, hydraulically operatively connectable to the steering cylinder via a steering assembly in the sense of a main flow connection. The steering cylinder can, for example, be actuated via a manual steering wheel via the steering assembly. Furthermore, it is known in the case of hydraulic steering devices of this type that a secondary flow connection is to be formed for mechanised or automatic actuation of the steering cylinder. For this purpose, the supply system can be flexibly hydraulically operatively connected to the steering cylinder via a flow regulating valve arrangement, past the main flow connection. To this end, the flow regulating valve arrangement can comprise multiple independently actuable valves by means of which feeds and returns to working chambers of the steering cylinder can be adjusted. The valves can be actuated in the known way via a control unit having steering software in order to produce a steering function. It is also known that the hydraulic steering device should be controlled with the control unit such that wrong adjustments of one or more valves are compensated for by other valves. A further wrong movement of the steering cylinder can thus be prevented and any position deviations which already exist can be largely corrected.

However, with such control techniques, there frequently remains a residual control deviation which cannot be automatically eliminated. The consequence is a residual deviation of the lane of the vehicle having the hydraulic steering device from the lane actually desired. The same applies to cases where, due to unforeseeable disturbing factors to which any technical system can be subjected, the valves receive a faulty control variable as the actuation signal. Purely by way of example, in the case of a valve which is to be opened electromagnetically, this can be a deviation of the actual value of the actuation current from its nominal value.

It is now the object of the present invention to indicate a generic hydraulic steering device which guarantees an increased measure of functional safety.

This object is achieved by the subject matter of the independent claims 1 and 8. Further preferred configurations of the invention are produced by the remaining features which are indicated in the subordinate claims.

The subject matter of the invention is a hydraulic steering device which hydraulically connects a steering cylinder to a supply system. In this case, the supply system is hydraulically operatively connectable to the steering cylinder via a steering assembly for the purposes of forming a main flow connection. The supply system is furthermore hydraulically operatively connectable to the steering cylinder via a flow regulating valve arrangement, such that a secondary flow connection can be formed which bypasses the main flow connection. Via the secondary flow connection at least one first working chamber and one second working chamber of the steering cylinder can be supplied independently of one another with hydraulic fluid. The flow regulating valve arrangement comprises multiple independently actuable valves by means of which at least a first feed and a first return to or respectively from the first working chamber and a second feed and a second return to or respectively from the second working chamber can be adjusted. The hydraulic steering device furthermore comprises at least one shut-off valve for shutting off the secondary flow connection at least in sections and at least one electrical control unit which is designed to output actuation currents for one or more valves. According to the invention, it is provided that the hydraulic steering device comprises means for measuring and for comparing at least two actuation currents and the means are furthermore designed to move at least the shut-off valve into a shut-off position in the presence of a deviation of compared actuation currents. The actuation currents are preferably compared in pairs.

The flow regulating valve arrangement can have a separate valve, for example a 2/2-way valve, for example for each feed and each return. However, the flow regulating valve arrangement can also have other valve types which are suitable for adjusting at least the first feed, the first return, the second feed and the second return. If, purely by way of example, 4/3-way valves or 3/3-way valves are used, the number of valves required in total (except for the shut-off valve) for adjusting the feeds and returns can be reduced from, for example, four to two.

With respect to the actuation currents, depending on the valve type, different electrical inputs may be available, via which different switching states or respectively operating states of the valve can be adjusted. All this is well known to the person skilled in the art. By way of example, electromagnetically switchable valves having more than one electrically actuatable magnet are to be indicated here.

Even if the following is readily disclosed to the competent person skilled in the art, it is still stated, in the interests of clarity, at which electrical input the actuation current is to be measured for the comparison, if multiple electrical inputs are available at a valve. In connection with the present invention, it is the case here that the actuation current is to be measured at that electrical input of the respective valve which is to be actuated in order to configure the respective switching state of the valve which is required at that moment to realise the respective feed or return. The required operating state depends on the operating state of the hydraulic steering device, which is desired at that moment. If, for example, for a movement of the steering cylinder in one direction, the first feed and the second return are to be opened and the valves to be actuated for this purpose have, in each case, multiple electrical inputs, those inputs which open the first feed and second return are supplied with actuation currents. The actuation currents applied at the relevant inputs are then also those actuation currents which are measured and compared within the meaning of the invention.

In the case of traveling movements of the steering cylinder, it is necessary in the majority of operating states for the valves for adjusting the first feed and the second return or respectively the valves for adjusting the second feed and the first return to have an identical degree of opening. This is necessary in order to guarantee a uniform inflow of hydraulic fluid into, for example, the first working chamber of the steering cylinder and a uniform exhaust flow of hydraulic fluid from, for example, the second working chamber of the steering cylinder (or vice versa) and, thus, a uniform and controlled steering movement. Here, the size of the actuation currents for the respective valves frequently constitutes a measure of the degree of opening of the respective valve. Corresponding nominal value specifications for the actuation currents are then accordingly identical in the case of those valves which are to have an identical degree of opening. By measuring and comparing the actuation currents of the valves actually applied with the same nominal value specifications, it can therefore be quickly and simply established, by detecting differences in the sizes of the actuation currents, whether fault influences are effective here. In other words, in such cases, the actuation currents applied are not plausible with respect to the desired operating state of the valves and the hydraulic steering device.

Here, the hydraulic steering device according to the invention offers the advantage that even in the presence of faulty actuation signals, a faulty steering movement does not occur at all. The hydraulic assistance or automatic performance of the steering movement via the secondary flow connection is then completely deactivated. In such a case, there always remains the possibility of purely manual control via the steering assembly.

It is also noted, purely for reasons of clarity, that the expression that the first working chamber and the second working chamber of the steering cylinder "can be supplied" with hydraulic fluid independently of one another comprises both the specified supply and the specified discharge of hydraulic fluid into or respectively from the respective working chamber.

In another preferred configuration of the invention, it is provided that the means are designed to measure the actuation currents of all of the valves and to compare the actuation currents of the valves for adjusting the first feed and the second return in pairs, and to compare the actuation currents of the valves for adjusting the second feed and the first return in pairs.

The advantage of this is that the described safety functionality is provided in both traveling directions of the steering cylinder. This principle can of course be transferred to hydraulic actuators having multiple actuable degrees of freedom.

In another preferred configuration of the invention, it is provided that the means are designed to move all of the valves and the shut-off valve into a shut-off position in the presence of a deviation of compared actuation currents.

The advantage of this is that the safety of the hydraulic steering device is further increased. In the event of a malfunction of the shut-off valve, a deactivation of the secondary flow connection is thus furthermore guaranteed.

In another preferred configuration of the invention, it is provided that the means comprise at least a number of sensors for measuring the actuation currents and a comparison algorithm. The comparison algorithm can preferably be implemented in steering software of the control unit.

The advantage of this is that the hydraulic steering device has a simple and safe construction.

In another preferred configuration of the invention, it is provided that the control unit additionally comprises a conventional control algorithm for suppressing position deviations of the steering cylinder.

As a result, the operating comfort, the flexibility and the safety of the hydraulic steering device are advantageously increased. For example, automatic vehicle operation is also possible.

In another preferred configuration of the invention, it is provided that the valves of the flow regulating valve arrangement are designed as proportional flow valves or proportional valves.

In another preferred configuration of the invention, it is provided that the flow regulating valve arrangement can also be operated as a solo unit, as pure "steer-by-wire steering".

As a result, the operating comfort, the flexibility and the safety of the hydraulic steering device are advantageously further increased.

A further aspect of the invention relates to a method for safeguarding a hydraulic steering device which hydraulically connects a steering cylinder to a supply system. In this case, the supply system is hydraulically operatively connectable to the steering cylinder via a steering assembly for the purposes of forming a main flow connection. The supply system is hydraulically operatively connected to the steering cylinder via a flow regulating valve arrangement, such that a secondary flow connection is formed which bypasses the main flow connection. Via the secondary flow connection at least one first working chamber and/or one second working chamber of the steering cylinder are supplied independently of one another with hydraulic fluid. The flow regulating valve arrangement comprises multiple independently actuable valves by means of which at least a first feed and/or a first return for the first working chamber and a second feed and/or a second return for the second working chamber are adjusted. The hydraulic steering device furthermore comprises at least one shut-off valve for shutting off the secondary flow connection at least in sections and furthermore comprises at least one electrical control unit which outputs actuation currents for one or more valves. According to the invention, the method comprises at least the following further steps of: measuring at least two actuation currents; comparing at least two actuation currents; and displacing at least the shut-off valve into a shut-off position in the presence of a deviation of compared actuation currents. The actuation currents are preferably compared in pairs.

The hydraulic steering device of the method of the invention corresponds to the hydraulic steering device according to the invention described above. Consequently, the corresponding advantages of the hydraulic steering device according to the invention also apply analogously to the method according to the invention.

It is also noted that the expression that the first working chamber and/or the second working chamber of the steering cylinder "are supplied" independently of one another with hydraulic fluid comprises both the specified supply and the specified discharge of hydraulic fluid into or respectively from the respective working chamber.

In a preferred configuration of the method of the invention, it is provided that the actuation currents of all of the valves are measured; and the actuation currents of the valves for adjusting the first feed and the second return are compared in pairs, and the actuation currents of the valves for adjusting the second feed and the first return are compared in pairs.

The individual features disclosed in this application can be advantageously combined with one another.

The invention is explained in greater detail below with reference to an embodiment example and accompanying drawings, wherein:

FIG. 1 shows a representation in principle of a hydraulic steering device 10 according to the invention in a preferred embodiment. The hydraulic steering device 10 also comprises, in a simplified representation, the features shown in FIG. 1 of DE 10 2011 112 625 A1, but it differs from this with respect to some of the features described below.

Figure 1:
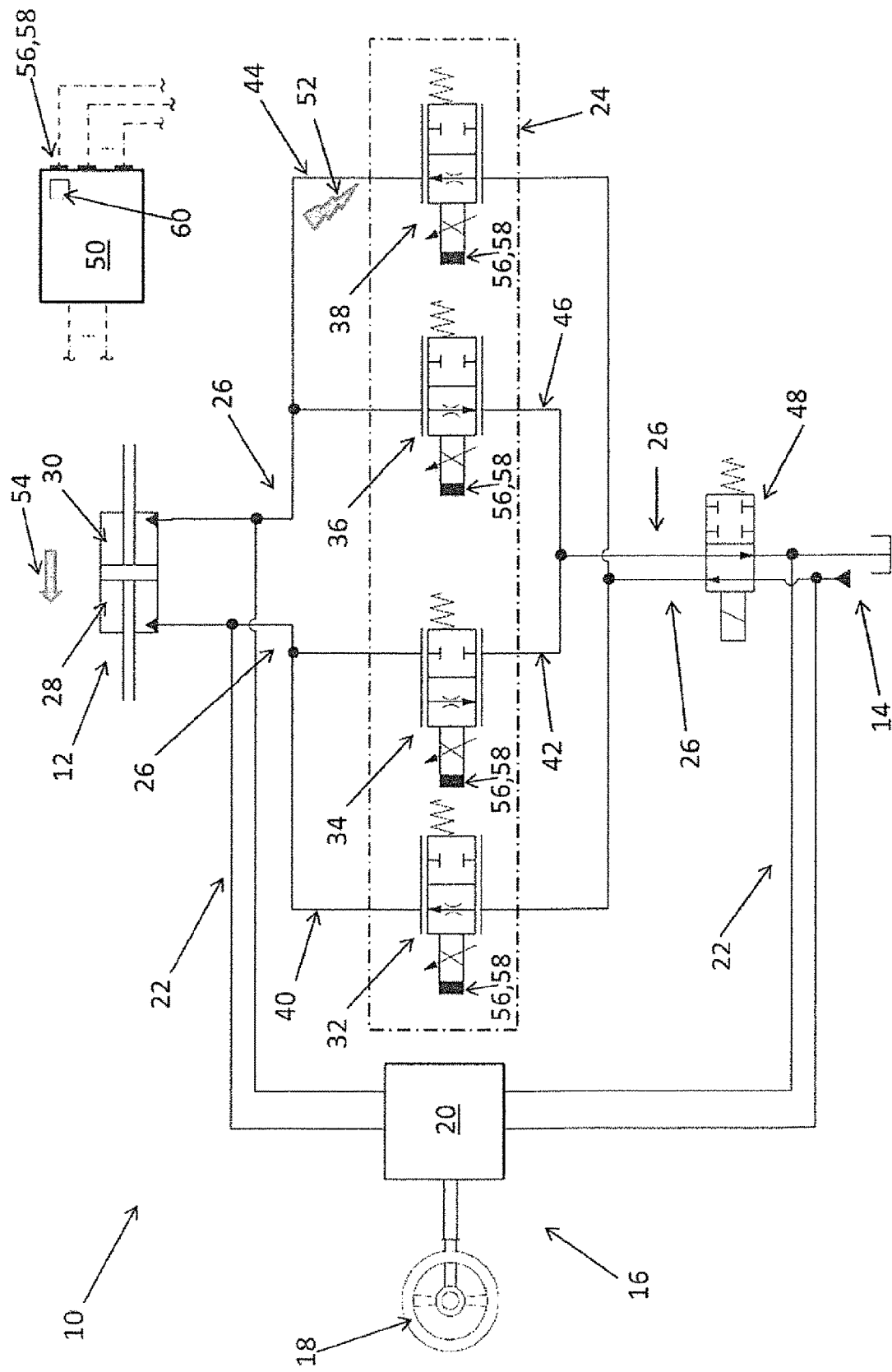
FIG. 1 shows a representation in principle of a hydraulic steering device according to the invention in a preferred embodiment.

The hydraulic steering device 10 firstly comprises a steering cylinder 12. The steering cylinder 12 is hydraulically connected to a supply system 14. Here, the supply system comprises a feed pump having a reservoir of hydraulic fluid. The supply system 14 is furthermore hydraulically operatively connectable to the steering cylinder 12 via a steering assembly 16. Here, the steering assembly 16 comprises a manual steering wheel 18 and a steering valve 20. Consequently, a main flow connection 22 is formed between the supply system 14 and the steering cylinder 12.

The supply system 14 is furthermore hydraulically operatively connectable to the steering cylinder 12 via a flow regulating valve arrangement 24, such that a secondary flow connection 26 can be formed. If it is formed, this bypasses the main flow connection 22. The secondary flow connection 26 is formed if hydraulic fluid can travel between the steering cylinder 12 and the supply system 14 via the flow regulating valve arrangement 24. Otherwise, it is not formed or is respectively interrupted or shut off.

The steering cylinder 12 has a first working chamber 28 and a second working chamber 30. This first working chamber 28 and second working chamber 30 can be supplied independently of one another with hydraulic fluid via the secondary flow connection 26. For this purpose, the flow regulating valve arrangement 24 comprises multiple independently actuable valves 32, 34, 36, 38. The valves 32, 34, 36, 38 of the flow regulating valve arrangement 24 are, in the present case, purely by way of example, represented and designed as electromagnetically operable 2/2-way proportional flow valves. However, they can also be designed as proportional valves of another type or as other valves which are known to the person skilled in the art. Here, a first feed 40 can be adjusted via the valve 32 and a first return 42 for the first working chamber 28 can be adjusted via the valve 34. The adjustment is made by a specified opening or closing of the valves 32, 34. Here, a second feed 44 can be adjusted via the valve 38 and a second return 46 for the second working chamber 30 can be adjusted via the valve 36.

The hydraulic steering device 10 furthermore comprises a shut-off valve 48 for shutting off the entire secondary flow connection 26. The hydraulic steering device 10 furthermore comprises an electrical control unit 50. The control unit 50 is designed to output actuation currents for one or more valves 32, 34, 36, 38 and further elements of the hydraulic steering device.

Here, the control unit 50 also comprises a conventional control algorithm for suppressing position deviations of the steering cylinder 12. Such control algorithms are well known to the person skilled in the art, such that an explanation is only given by way of example here. If, for example, a fault influence 52 results in the valve 38 being open and this is not desired, the control algorithm detects a position deviation 54 occurring at the steering cylinder 12. The control algorithm stops the occurring position deviation 54 by opening the valve 36, as a result of which a superfluous volume flow of hydraulic fluid in the second feed 44 in the direction of the second working chamber 30 is stopped and is discharged via the valve 36 in the second return 46. The already existing position deviation 54 at the steering cylinder 12 is then compensated for by the control algorithm by opening the valve 32. A residual control deviation usually remains in the case of such control techniques.

According to the invention, the hydraulic steering device 12 furthermore comprises means 56 for measuring and for comparing at least two actuation currents in pairs. In this embodiment example, the means 56 are designed to capture the actuation currents of all of the valves 32, 34, 36, 38 by means of measurement. For this purpose, the means 56 can comprise a number of sensors 58 for measuring the actuation currents directly at the output of the control unit 50, at the valves 32, 34, 36, 38 or therebetween.

In the majority of operating states, the valves 32 and 36 and the valves 34 and 38 require identical degrees of opening, that is to say identical electrical actuation currents. If this condition is not satisfied, the state of the hydraulic steering device 12 is not plausible for proper operation.

The means 56 are therefore designed to compare at least two actuation currents in pairs (the actuation currents of the valves 32 and 36 and/or of the valves 34 and 38) and to move the shut-off valve 48 into a shut-off position in the presence of a deviation of compared actuation currents. In this embodiment example, the means 56 are designed to compare the actuation currents of the valves 32 and 36 which serve to adjust the first feed 40 and the second return 46, and also to compare the valves 34 and 38 which serve to adjust the second feed 44 and the first return 42. The means 56 comprise a corresponding comparison algorithm 60 which is implemented here, by way of example, in the control unit 50.

Figure 2:
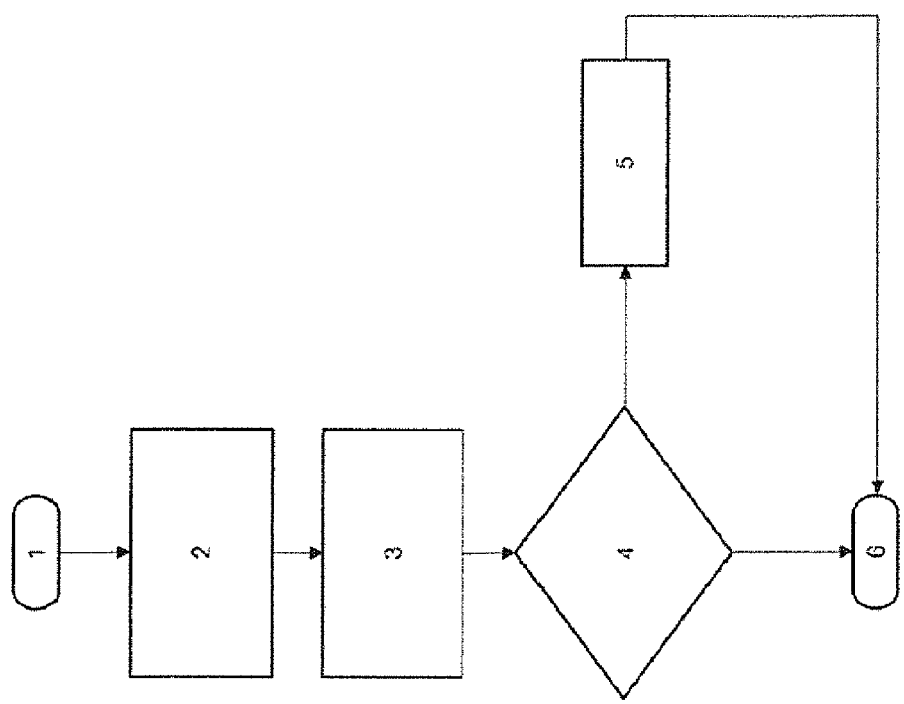
FIG. 2 shows a block diagram of a method according to the invention for safeguarding a hydraulic steering device in a preferred embodiment.

FIG. 2 shows a block diagram of a method according to the invention for safeguarding a hydraulic steering device which hydraulically connects a steering cylinder to a supply system in a preferred embodiment. The underlying hydraulic steering device is the hydraulic steering device 10 from FIG. 1. The supply system 14 is hydraulically operatively connectable to the steering cylinder 12 via a steering assembly 16 for the purposes of forming a main flow connection 22.

In a first method step, some fundamental and known procedures are combined. The supply system 14 is thus hydraulically operatively connected to the steering cylinder 12 via the flow regulating valve arrangement 24, such that the secondary flow connection 26 is formed which bypasses the main flow connection 22. Via the secondary flow connection 26 the first working chamber 28 and the second working chamber 30 of the steering cylinder 12 are supplied independently of one another with hydraulic fluid. Here, purely by way of example, hydraulic fluid is supplied to the first working chambers 28 and hydraulic fluid is discharged from the second working chamber 30 in a controlled manner.

All in all, the flow regulating valve arrangement 24 comprises multiple independently actuable valves 32, 34, 36, 38. For the first working chamber 28 the first feed 40 is opened as specified with the valve 32 and the first return 42 is closed with the valve 34. For the second working chamber 30, the second feed 44 is closed with the valve 38 and the second return 46 is opened as specified with the valve 36. As a result of the fact that the valve 36 is opened as specified, a counterpressure can build up at the valve 36 and hydraulic fluid can be discharged as specified from the second working chamber 30. The nominal values for the actuation currents of the valves 32, 36 are, in this case, selected to be identical.

If, on the other hand, hydraulic fluid is to be supplied to the second working chamber 30 and hydraulic fluid is to be discharged in a controlled manner from the first working chambers 28, the procedures described above take place in a similar manner.

The electrical control unit 50 of the hydraulic steering device 10 outputs corresponding actuation currents for the valves 32, 34, 36, 38.

The following method steps are fundamental to the invention. In a second method step, the actuation currents of the valves 32, 34, 36, 38 are measured. In a third method step, the actuation currents of the valves 32, 36 and 34, 38 are compared in pairs. In a fourth method step, the results of the comparisons conducted in pairs are evaluated. If the actuation currents of the valves 32, 36 and/or 34, 38 do not correspond, the shut-off valve 48 is moved into a shut-off position in a fifth method step and, then in a sixth method step, the performance of the comparison algorithm is ended. If both the actuation currents of the valves 32 and 36 and of the valves 34 and 38 correspond, the performance of the comparison algorithm will run through again as of method step 1 or 2 in the sixth method step.

Figure 3A:
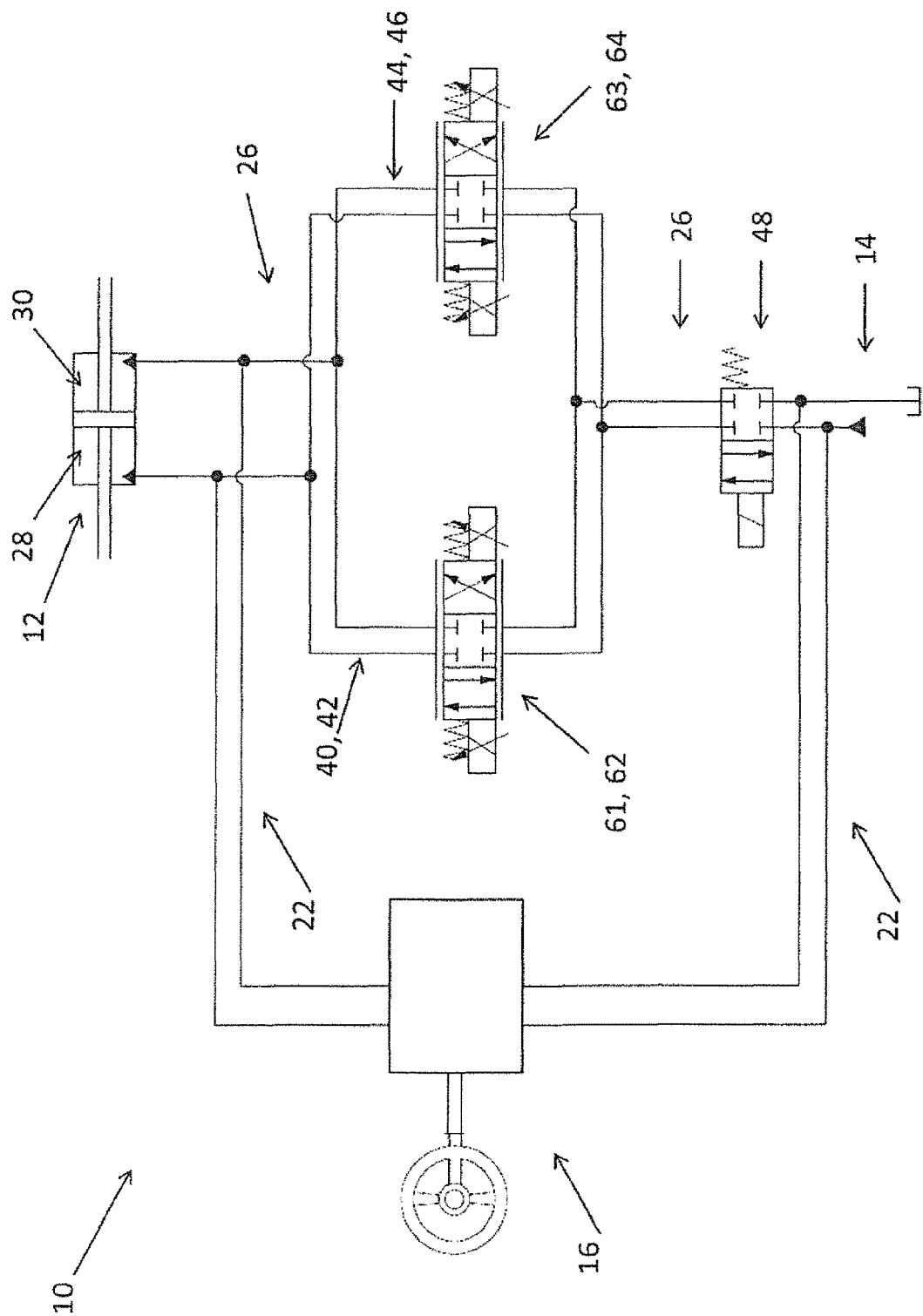
FIG. 3a-c show a representation in principle of a hydraulic steering device according to the invention in alternative preferred embodiments.
Figure 3B:
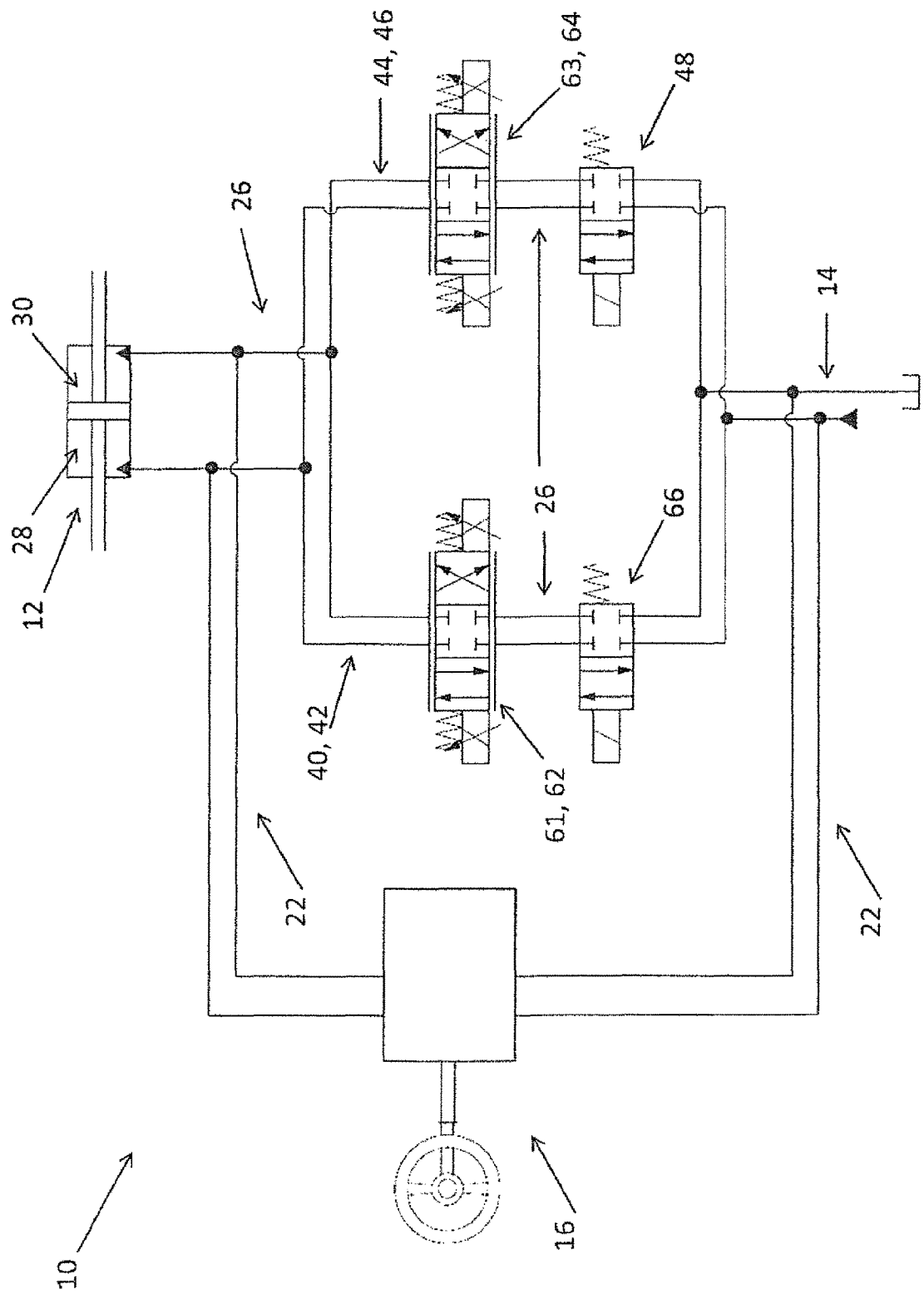
Figure 3C:
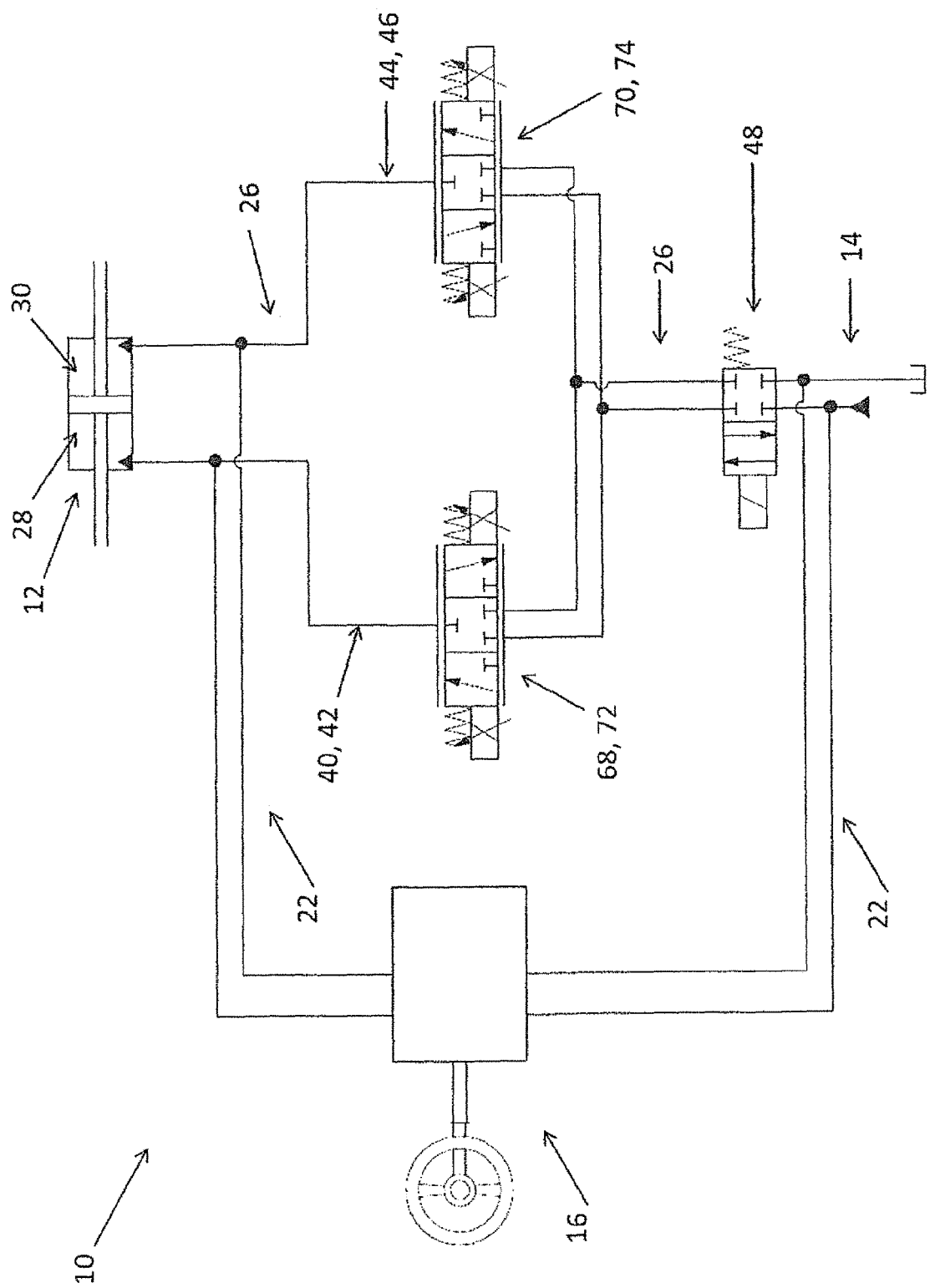

FIG. 3 shows a representation in principle of a hydraulic steering device according to the invention in alternative preferred embodiments. The hydraulic steering device 10 in FIGS. 3a, 3b and 3c largely corresponds to that in FIG. 1. These merely highlight the constructive differences.

In the embodiment shown in FIG. 3a, the four valves 32, 34, 36, 38, which are represented as 2/2-way valves in FIG. 1, are replaced by two likewise independently actuable valves 61, 63 of another construction. The valves 61, 63 are represented in this embodiment example as two 4/3-way valves 62, 64. The secondary flow connection 26 can be produced and shut off via the shut-off valve 48.

In the embodiment shown in FIG. 3b, the four valves 32, 34, 36, 38, which are represented in FIG. 1 as 2/2-way valves, are equally replaced by the valves 61, 63, which are represented here in the form of the two 4/3-way valves 62, 64. The secondary flow connection 26 can, however, be produced and shut off via the shut-off valve 48 and a further shut-off valve 66.

In the embodiment shown in FIG. 3c, the four valves 32, 34, 36, 38, which are represented in FIG. 1 as 2/2-way valves, are replaced by two independently actuable valves 68, 70 of a further alternative construction. The valves 68, 70 are represented in this embodiment example as two 3/3-way valves 72, 74. The secondary flow connection 26 can be produced and shut off via the shut-off valve 48.

As regards their constructive form, the embodiments shown have a particularly compact configuration.

REFERENCE NUMERALS

10 Hydraulic steering device
12 Steering cylinder
14 Supply system
16 Steering assembly
18 Manual steering wheel
20 Steering valve
22 Main flow connection
24 Flow regulating valve arrangement
26 Secondary flow connection
28 First working chamber
30 Second working chamber
32 Valve
34 Valve
36 Valve
38 Valve
40 First feed
42 First return
44 Second feed
46 Second return
48 Shut-off valve
50 Control unit
52 Fault influence
54 Position deviation
56 Means
58 Sensors
60 Comparison algorithm
61 Valve
62 4/3-way valve
63 Valve
64 4/3-way valve
66 Shut-off valve
68 Valve
70 Valve
72 3/3-way valve
74 3/3-way valve

The invention claimed is:

1. A hydraulic steering device comprising:
a supply system hydraulically and operatively connected to a steering cylinder via a steering assembly for the purposes of forming a main flow connection, wherein the supply system is furthermore hydraulically operatively connectable to the steering cylinder via a flow regulating valve arrangement, such that a secondary flow connection can be formed which bypasses the main flow connection and via which at least one first working chamber and one second working chamber of the steering cylinder can be supplied independently of one another with hydraulic fluid, wherein the flow regulating valve arrangement comprises multiple independently actuable valves by means of which at least a first feed and a first return for the first working chamber and a second feed and a second return for the second working chamber can be adjusted;
at least one shut-off valve for shutting off the secondary flow connection at least in sections;
at least one electrical control unit which is designed to output actuation currents for one or more of the independently actuable valves,
a first means for measuring at least two actuation currents; and
a second means for comparing the at least two actuation currents, wherein the second means is furthermore designed to move at least the shut-off valve into a shut-off position in the presence of a deviation of compared actuation currents.

2. The hydraulic steering device according to claim 1, wherein the first means is designed to measure the actuation currents of all of the valves and the second means is designed to compare the actuation currents of the valves for adjusting the first feed and the second return in pairs and to compare the actuation currents of the valves for adjusting the second feed and the first return in pairs.

3. The hydraulic steering device according to claim 1, wherein the second means is designed to move all of the valves and the shut-off valve into a shut-off position in the presence of a deviation of compared actuation currents.

4. The hydraulic steering device according to claim 1, wherein the first means comprises at least a number of sensors for measuring the actuation currents and the second means comprises a comparison algorithm.

5. The hydraulic steering device according to claim 1, wherein the control unit additionally comprises a conventional control algorithm for suppressing position deviations of the steering cylinder.

6. The hydraulic steering device according to claim 1, wherein the valves of the flow regulating valve arrangement are designed as proportional flow valves or proportional valves.

7. A method for safeguarding a hydraulic steering device, the method comprising:
   hydraulically connecting a steering cylinder to a supply system via the hydraulic steering device, wherein the supply system is hydraulically operatively connectable to the steering cylinder via a steering assembly for the purposes of forming a main flow connection, and the supply system is furthermore hydraulically operatively connected to the steering cylinder via a flow regulating valve arrangement that forms a secondary flow connection which bypasses the main flow connection and via which at least one first working chamber and/or one second working chamber of the steering cylinder are supplied independently of one another with hydraulic fluid, wherein the flow regulating valve arrangement comprises multiple independently actuable valves by means of which at least a first feed and/or a first return for the first working chamber and a second feed and/or a second return for the second working chamber are adjustable, and wherein the hydraulic steering device furthermore comprises at least one shut-off valve for shutting off the secondary flow connection at least in sections and at least one electrical control unit which outputs actuation currents for one or more valves;
   measuring at least two actuation currents;
   comparing at least two actuation currents; and
   displacing at least the shut-off valve into a shut-off position in the presence of a deviation of compared actuation currents.

8. The method according to claim 7, further comprising at least one of:
   measuring the actuation currents of all of the valves;
   comparing the actuation currents of the valves for adjusting the first feed and the second return in pairs; and
   comparing the actuation currents of the valves for adjusting the second feed and the first return in pairs.

* * * * *